United States Patent
Wang et al.

(10) Patent No.: US 11,281,046 B2
(45) Date of Patent: Mar. 22, 2022

(54) BACKLIGHT MODULE, MANUFACTURING METHOD THEREOF, AND DISPLAY DEVICE

(71) Applicant: SHENZHEN CHINA STAR OPTOELECTRONICS SEMICONDUCTOR DISPLAY TECHNOLOGY CO., LTD., Shenzhen (CN)

(72) Inventors: Mingyao Wang, Guangdong (CN); Junling Liu, Guangdong (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/962,042

(22) PCT Filed: May 19, 2020

(86) PCT No.: PCT/CN2020/090943
§ 371 (c)(1),
(2) Date: Jul. 14, 2020

(87) PCT Pub. No.: WO2021/184522
PCT Pub. Date: Sep. 23, 2021

(65) Prior Publication Data
US 2021/0294158 A1    Sep. 23, 2021

(30) Foreign Application Priority Data
Mar. 17, 2020  (CN) .......................... 202010188263.5

(51) Int. Cl.
G02F 1/00  (2006.01)
G02F 1/13357  (2006.01)

(52) U.S. Cl.
CPC .............................. *G02F 1/133603* (2013.01)

(58) Field of Classification Search
CPC .............. H05K 1/147; G02F 1/133603; H01L 27/3246; H01L 27/3276
See application file for complete search history.

(56) References Cited

U.S. PATENT DOCUMENTS

2004/0041958 A1* 3/2004 Hwang ............. G02F 1/136286
349/43
2004/0089868 A1  5/2004 Hon et al.
(Continued)

FOREIGN PATENT DOCUMENTS

CN  109037262 A  12/2018
CN  110010621 A  7/2019
(Continued)

*Primary Examiner* — Gerald J Sufleta, II
(74) *Attorney, Agent, or Firm* — The Roy Gross Law Firm, LLC; Roy Gross

(57) ABSTRACT

A backlight module includes an array substrate and light-emitting devices disposed on the array substrate. The array substrate includes: a substrate, a first metal layer and a second metal layer disposed on the substrate; a planarization layer covering the first metal layer and the second metal layer and exposing portions of the first metal layer and the second metal layer; and a metal laminating layer disposed on the planarization layer and contacting the portions of the first metal layer and the second metal layer exposed by the planarization layer; the metal laminating layer including at least one first metal layer, at least one second metal layer, and at least one metal oxide layer, and the first metal is molybdenum. The second metal has high light reflectivity and its conductivity is higher than that of the metal oxide, which can effectively reduce optical loss and achieve higher conductivity.

13 Claims, 5 Drawing Sheets

(56) References Cited

U.S. PATENT DOCUMENTS

| | | | |
|---|---|---|---|
| 2011/0090445 A1* | 4/2011 | Kim | G02F 1/1339 349/139 |
| 2015/0060863 A1* | 3/2015 | Li | G02F 1/136213 257/71 |
| 2015/0147837 A1* | 5/2015 | Kwon | H01L 21/31144 438/34 |
| 2016/0027920 A1* | 1/2016 | Kim | H01L 23/53238 257/43 |
| 2018/0114802 A1* | 4/2018 | Lin | H01L 29/4908 |
| 2019/0171318 A1* | 6/2019 | Ryu | G06F 3/0412 |
| 2019/0198589 A1* | 6/2019 | Choi | H01L 27/3246 |
| 2020/0035890 A1* | 1/2020 | Yoon | H01L 33/24 |
| 2020/0135819 A1* | 4/2020 | Kim | H01L 51/56 |
| 2020/0235144 A1* | 7/2020 | Han | H01L 27/14636 |
| 2020/0381455 A1* | 12/2020 | Zhao | H01L 27/124 |
| 2020/0395428 A1* | 12/2020 | Baek | H01L 51/56 |

FOREIGN PATENT DOCUMENTS

| | | |
|---|---|---|
| CN | 110379322 A | 10/2019 |
| CN | 110783362 A | 2/2020 |

\* cited by examiner

BACKLIGHT MODULE, MANUFACTURING METHOD THEREOF, AND DISPLAY DEVICE

FIELD OF INVENTION

The present application relates to the field of display technology, and in particular, to a backlight module, a manufacturing method thereof, and a display device.

BACKGROUND OF INVENTION

With advancement of display technologies, micro-light-emitting diodes (micro-LEDs) have become one of hot spot future display technologies. Compared with current liquid crystal displays (LCDs) and organic light-emitting diode (OLED) display devices, micro-LEDs have advantages of fast response times, high color gamut, high pixels per inch (PPI), low energy consumption, etc. However, the technical difficulties thereof to be overcome are numerous and complicated, especially critical mass transfer technology and miniaturization of light-emitting diode (LED) particles have encountered a technical bottleneck. Mini-light-emitting diode (mini-LED) display devices, as products combining mini-LEDs and a backplane, have characteristics of high contrast, high color performance, etc., comparable to OLEDs. Although production costs of mini-LEDs are slightly higher than that of LCDs, but cost only about 60% of that of OLEDs. Compared with micro-LEDs and OLEDs, mini-LEDs are easier to implement, and so have become a hot spot for major panel manufacturers.

In a manufacturing process of a traditional mini-LED backlight substrate, it is necessary to use white oil, white organic photoresist, etc. as a reflective material in the organic layer to avoid an influence of light on the performance of the device, and an indium tin oxide (ITO) layer is connected with deep and shallow via holes to complete the manufacture. However, as a metal oxide, ITO has lower conductivity than metal, and ages in time or under high temperature, causing the via holes to lose their connecting function.

Therefore, there are defects in current technology and need to be improved urgently.

Technical Problem

The purpose of the present invention is to provide a backlight module, a manufacturing method thereof, and a display device using the backlight module to solve technical problems that indium tin oxide (ITO) material of prior art has low conductivity, slow response times, and the via hole loses its connection function due to an aging phenomenon after high temperature. Meanwhile, it effectively reduces light loss and energy consumption.

SUMMARY OF INVENTION

An embodiment of the present application provides a backlight module, including an array substrate and a plurality of light-emitting devices disposed on the array substrate, characterized in that the array substrate includes: a substrate, and a first metal layer and a second metal layer disposed on the substrate; a planarization layer covering the first metal layer and the second metal layer, and exposing a portion of the first metal layer and a portion of the second metal layer; and a metal laminating layer disposed on the planarization layer and contacting the portion of the first metal layer and the portion of the second metal layer exposed by the planarization layer; and wherein the metal laminating layer includes at least one layer of a first metal, at least one layer of a second metal, and at least one layer of metal oxide.

In some embodiments, the first metal is molybdenum.

In some embodiments, the first metal is copper.

In some embodiments, the first metal is an alloy composed of molybdenum and copper.

In some embodiments, the first metal contacts the first metal layer and the second metal layer.

In some embodiments, the conductivity of the first metal is higher than that of the metal oxide.

In some embodiments, the light reflectance of the second metal is greater than or equal to 80%.

In some embodiments, the conductivity of the second metal is higher than that of the metal oxide.

In some embodiments, the second metal is an alloy including one or more alloys of molybdenum, aluminum, silver, titanium, and nickel.

In some embodiments, the second metal is disposed between the first metal and the metal oxide.

In some embodiments, the metal oxide is a compound including at least one of indium tin oxide, indium zinc oxide, or indium zinc tin oxide.

In some embodiments, the array substrate further includes an insulating layer, the insulating layer is disposed between the first metal layer and the second metal layer and covers the first metal layer, and the insulating layer exposes a portion of the first metal layer to enable the metal laminating layer to contact the portion of the first metal layer through the planarization layer and the insulating layer.

In some embodiments, the second metal layer includes at least one pad area, the planarization layer exposes the at least one pad area, and the metal laminating layer exposes the at least one pad area.

In some embodiments, the at least one pad area is disposed in an array or evenly on the second metal layer.

In some embodiments, the plurality of light-emitting devices are disposed on the array substrate through the at least one pad area.

An embodiment of the present application provides a display device including the aforementioned backlight module.

An embodiment of the present application provides a method of manufacturing the aforementioned backlight module, including the following steps: providing a substrate, and forming a patterned first metal layer on the substrate; forming an insulating layer on the substrate to cover the first metal layer and the substrate; forming a patterned active layer and a second metal layer on the insulating layer; forming a planarization layer on the insulating layer to cover the active layer, the second metal layer, and the insulating layer; forming a first via hole penetrating the planarization layer and the insulating layer to expose a portion of the first metal layer, and forming a second via hole penetrating the planarization layer to expose a portion of the second metal layer; and forming a metal laminating layer on the planarization layer, the metal laminating layer contacting the portion of the first metal layer through the first via hole, and the metal laminating layer contacting the portion of the second metal layer through the second via hole.

In some embodiments, the second metal layer includes at least one pad area, and forming a first opening in a step of forming the first via hole and the second via hole to enable the planarization layer to expose the at least one pad area; and in a step of forming a metal laminating layer on the planarization layer, the metal laminating layer exposes the at least one pad area.

In some embodiments, the method of manufacturing the backlight module further includes mounting a plurality of light-emitting devices, wherein the plurality of light-emitting devices are disposed on the array substrate by connecting to the at least one pad area.

In some embodiments, a diameter of the first via hole and the second via hole is between 3 μm and 30 μm.

Beneficial Effect

In the backlight module of the present application, the metal laminating layer is used to connect the first metal layer and the second metal layer to solve technical problems that indium tin oxide (ITO) material of prior art has low conductivity, slow response times, and the via hole loses its connection function due to an aging phenomenon after high temperature.

In particular, in the backlight module of the present application, the metal laminating layer contacts the planarization layer through the first metal molybdenum. It not only achieves a high conductivity connection between the first metal layer and the second metal layer but also increases adhesion between the metal laminating layer and the planarization layer. In addition, a metal laminating layer selects the second metal with a light reflectance greater than 80%, which enables the metal laminating layer to achieve high light reflectivity, to replace an organic reflective layer in the prior art and reduce the manufacturing steps and costs.

Therefore, in the backlight module of the present application, the arrangement of the metal laminating layer can not only solve the technical problems that ITO has low conductivity and prone to failure but also can combine the organic reflective layer and the ITO layer that need to be separately patterned into one, to reduce manufacturing steps and masks used in the process so that saving the manufacturing cost.

DESCRIPTION OF DRAWINGS

The specific implementation of the present application will be described in detail below in conjunction with the accompanying drawings to make the technical solution and other beneficial effects of the present application obvious.

DETAILED DESCRIPTION OF PREFERRED EMBODIMENTS

Figure 1:
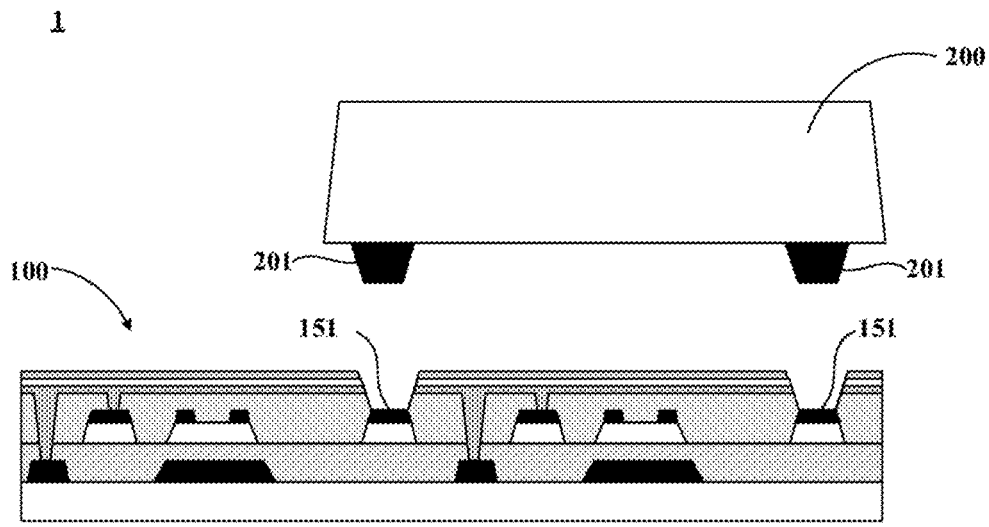
FIG. 1 is a schematic structural diagram of the backlight module according to an embodiment of the present application.

The technical solutions in the embodiments of the present application will be described clearly and completely with reference to the drawings in the embodiments of the present application. Obviously, the described embodiments are only a part of the embodiments of the present application, but not all the embodiments. Based on the embodiments of the present application, all other embodiments obtained by those skilled in the art without making creative work fall within the protection scope of the present application.

In the description of this application, it should be understood that the orientations or positional relationships indicated by the terms "center", "longitudinal", "transverse", "length", "width", "thickness", "above", "below", "front", "back", "left", "right", "vertical", "horizontal", "top", "bottom", "inner", "outer", "clockwise", "counterclockwise" etc., are based on those shown in the drawings. It is only for the convenience of describing the present application and simplifying the description, rather than indicating or implying that the device or element referred to must have a specific orientation, be constructed and operate in a specific orientation, and therefore cannot be construed as a limitation of the present application. In addition, the terms "first" and "second" are used for descriptive purposes only, and cannot be understood as indicating or implying relative importance or implicitly indicating the number of technical features indicated. Thus, the features defined as "first" and "second" may explicitly or implicitly include one or more of the features. In the description of this application, the meaning of "plurality" is two or more, unless otherwise specifically limited.

In the description of this application, it should be noted that, unless otherwise specified and limited, the terms "installation", "connected", and "connection" should be understood in a broad sense. For example, it can be fixed or detachable connected, or connected integrally. It can be a mechanical connection, an electrical connection or can communicate with each other. It can be directly connected or indirectly connected through an intermediate medium. It can be the connection between two elements or the interaction between two elements. Those of ordinary skill in the art can understand the specific meanings of the above terms in this application according to specific situations.

In this application, unless otherwise clearly specified and defined, the first feature "above" or "below" the second feature may include the first feature and the second feature in direct contact, it may also include that the first feature and the second feature are not in direct contact but are in contact through another feature between them. In addition, the first feature is "higher", "above" and "on" the second feature includes that the first feature is directly above and obliquely above the second feature, or simply means that the first feature is higher in level than the second feature. The first feature is "lower", "below" and "under" the second feature includes that the first feature is directly below and obliquely below the second feature, or simply means that the first feature is lower in level than the second feature.

The following disclosure provides various embodiments or examples for implementing different structures of the present application. In order to simplify the disclosure of the present application, the components and settings in specific embodiments are described below. Certainly, they are only embodiments and are not to limit this application. Moreover, the present application may repeat reference numerals and/or reference letters in different embodiments. Such repetition is for simplicity and clarity and does not indicate the relationship between the various embodiments and/or settings discussed. In addition, the present application provides embodiments of various specific processes and materials, but those of ordinary skill in the art may consider the application of other processes and/or the use of other materials.

Specifically, please refer to FIG. 1, an embodiment of the present application provides a backlight module 1 including an array substrate 100 and a plurality of light-emitting devices 200 disposed on the array substrate 100. It can be understood by those skilled in the art that only one light-emitting device 200 is shown in FIG. 1. In fact, the backlight module 1 includes a plurality of light-emitting devices 200, and the plurality of light-emitting devices 200 are arranged in an array or evenly disposed on the backlight module.

In this embodiment, the light-emitting device 200 is a mini-LED chip with a conventional structure, and the light-emitting device 200 is mounted on the array substrate 100 in a manner known in the art. For example, an electrode 201 of the light-emitting device 200 contacts and connects with the pad area 151 exposed on the array substrate 100, so as to mount the light-emitting device 200 on the array substrate 100. The structure of the array substrate 100 will be described in detail with reference to FIG. 2.

Figure 2:
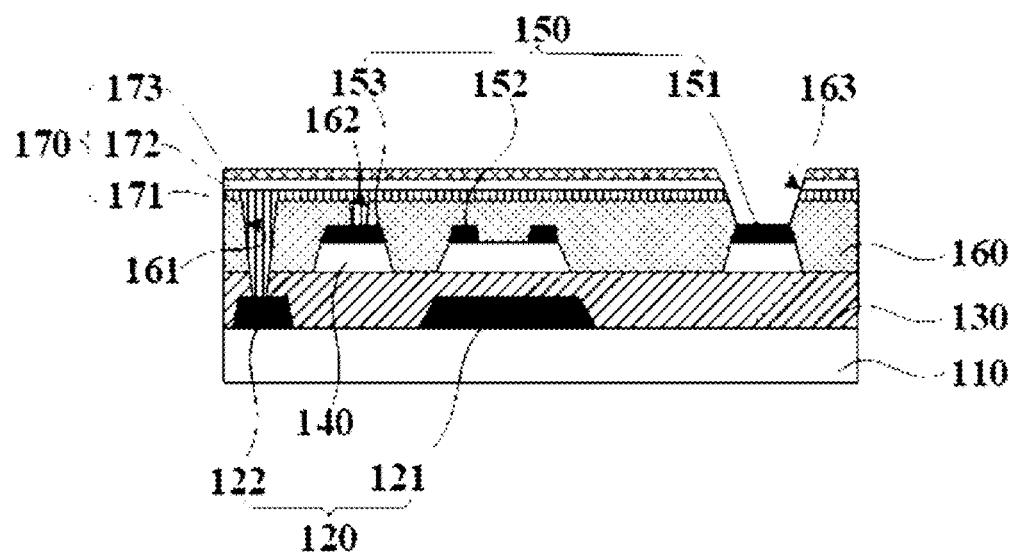
FIG. 2 is a schematic structural diagram of the array substrate of the backlight module according to an embodiment of the present application.

Please refer to FIG. 2, the array substrate 100 includes a substrate 110, a first metal layer 120, an insulating layer 130, an active layer 140, a second metal layer 150, a planarization layer 160, and a metal laminating 170.

As shown in FIG. 2, the substrate 110 is a conventional substrate in the art. The first metal layer 120 is disposed on the substrate 110 and includes a gate 121 and a first connecting portion 122 for connecting with the second metal layer 150. The insulating layer 130 is disposed on the first metal layer 120 and covers the substrate 110 and the first metal layer 120. The active layer 140 is disposed on the insulating layer 130. The second metal layer 150 is disposed on the active layer 140 and includes a pad area 151, a source and drain 152, and a second connecting portion 153 for connecting with the first metal layer 120. The planarization layer 160 is disposed on the second metal layer 150 and covers the second metal layer 150 and the insulating layer 130.

In this embodiment, a thickness of the insulating layer 130 is between 0.1 μm and 10 μm. The thickness of the insulating layer 130 is defined as a vertical height between a side close to an upper surface of the substrate 110 and a side away from an upper surface of the substrate 110.

As shown in FIG. 2, the planarization layer 160 has a first via hole 161, a second via hole 162, and a third via hole 163. The first via hole 161 penetrates the planarization layer 160 and the insulating layer 130 to expose the first connecting portion 122 connecting with the second metal layer 150 in the first metal layer 120. The second via hole 162 penetrates the planarization layer 160 to expose the second connecting portion 153 connecting with the first metal layer 120 in the second metal layer 150. The third via hole 163 penetrates the planarization layer 160 to expose the pad area 151.

As shown in FIG. 2, in this embodiment, a first metal 171 covers the planarization layer 160, the first via hole 161 and the second via hole 162, and exposes the third via hole 163. Therefore, the first metal 171 is in contact with the first connecting portion 122 through the first via hole 161 and is in contact with the second connecting portion 153 through the second via hole 162 to achieve the connection between the first metal layer 120 and the second metal layer 150. A second metal 172 covers the first metal 171 and exposes the third via hole 163. A metal oxide 173 covers the second metal 172 and exposes the third via hole 163.

In this application, the metal laminating layer 170 includes at least one layer of the first metal 171, at least one layer of the second metal 172, and at least one layer of metal oxide 173. As shown in FIG. 2, in this embodiment, the metal laminating layer 170 includes one layer of the first metal 171, one layer of the second metal 172, and at least one layer of the metal oxide 173. Those skilled in the art understand that the metal laminating layer 170 may include multiple layers of the first metal 171, the second metal 172, and the metal oxide 173 according to actual needs. For example, but not limited to, the metal laminating layer 170 may include one layer of first metal 171, two layers of second metal 172, and one layer of metal oxide 173, which is not limited to the structure shown in FIG. 2.

In this application, unless otherwise specified, the materials of the layers may be materials commonly used in the art.

For example, but not limited to, the substrate 110 may be a glass substrate, a polyimide substrate, or a film substrate. The material of the first metal layer 120 may be an alloy composed of one or two of molybdenum (Mo) or copper (Cu). The material of the insulating layer 130 may be a mixture including one or more of silicon nitride (SiN), silicon oxide (SiO), silicon oxynitride (SiON), and aluminum oxide ($AlO_x$). The material of the active layer 140 may be a mixture including one or more of organic semiconductor materials, metal oxides, nanomaterials, and graphene materials. The material of the second metal layer 150 is an alloy composed of one or two of molybdenum (Mo) or copper (Cu). The material of the planarization layer 160 may be a mixture including one or more of silicon nitride (SiN), silicon oxide (SiO), silicon oxynitride (SiON), and aluminum oxide ($AlO_x$).

In this application, the material of the first metal 171 is an alloy composed of one or two of molybdenum (Mo) or copper (Cu), and the conductivity of the first metal 171 is higher than that of the metal oxide 173 to provide higher conductivity.

The second metal 172 has high light reflectivity, and the light reflectance of the second metal 172 is greater than or equal to 80%, and the conductivity of the second metal 172 is higher than that of the metal oxide 173, to replace the reflective layer prepared by using white oil, white organic photoresist, etc. in a conventional organic layer structure, and provide higher conductivity. In this embodiment, the material of the second metal 172 is, for example, but not limited to an alloy composed of one or more of molybdenum (Mo), aluminum (Al), silver (Ag), titanium (Ti), and nickel (Ni). Those skilled in the art can understand that any metal with a light reflectivity greater than or equal to 80% and suitable for the field of display panels can be used as the second metal 172 of the present application.

The material of the metal oxide 173 is indium tin oxide (ITO), or other metal oxides, for example, but not limited to indium zinc oxide (IZO), indium zinc tin oxide (IZTO), and the like.

Those skilled in the art can understand that the metal laminating layer 170 is formed by laminating film layers of the first metal 171, the second metal 172, and the metal oxide 173. For example, but not limited to: molybdenum (Mo)/aluminum (Al)/indium tin oxide (ITO), molybdenum (Mo)/silver (Ag)/indium tin oxide (ITO), molybdenum (Mo)/titanium (Ti) Nickel (Ni) alloy/indium tin oxide (ITO), molybdenum (Mo)/aluminum (Al)/indium zinc oxide (IZO), molybdenum (Mo)/silver (Ag)/indium zinc oxide (IZO), molybdenum (Mo)/titanium (Ti) nickel (Ni) alloy/indium zinc oxide (IZO), molybdenum (Mo)/aluminum (Al)/indium zinc tin oxide (IZTO), molybdenum (Mo)/silver (Ag)/indium zinc tin oxide (IZTO), and molybdenum (Mo)/titanium (Ti) nickel (Ni) alloy/indium zinc oxide (IZTO).

The manufacturing method of the backlight module 1 according to the present application will be described in detail below with reference to FIGS. 3 and 4A to 4D. The manufacturing method includes the following steps.

Figure 3:
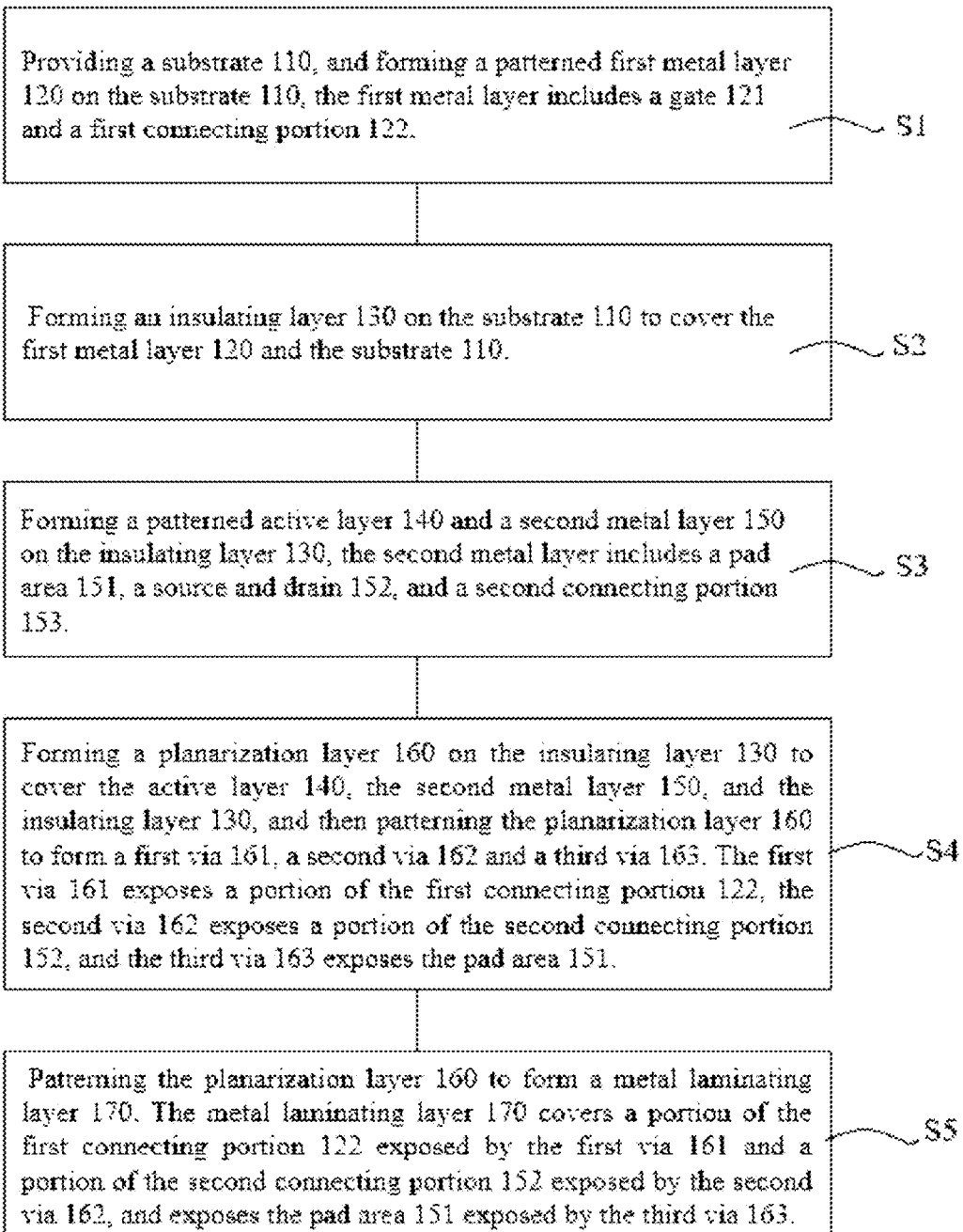
FIG. 3 is a manufacturing flow chart of the array substrate of the backlight module according to an embodiment of the present application.
Figure 4A:
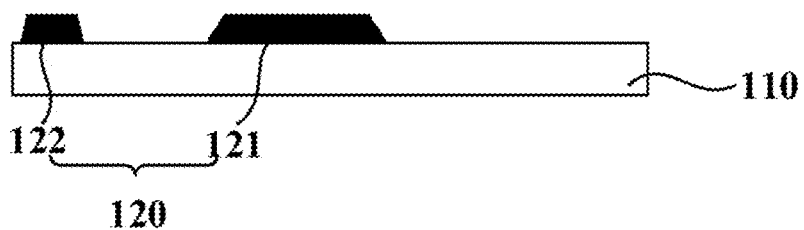
FIG. 4A to FIG. 4D are schematic structural diagrams corresponding to FIG. 3.

As shown in FIGS. 3 and 4A, the manufacturing method includes step S1: Providing the substrate 110, and forming a patterned first metal layer 120 on the substrate 110, and the first metal layer 120 includes a gate 121 and a first connecting portion 122.

Figure 4B:
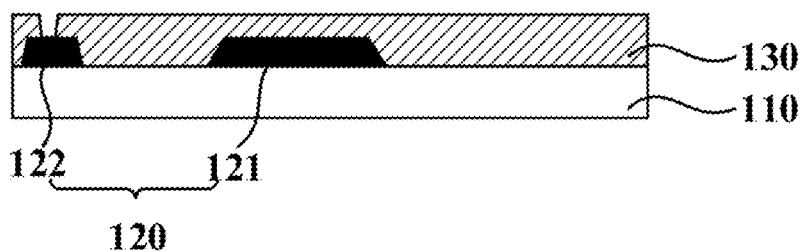

As shown in FIGS. 3 and 4B, the manufacturing method includes step S2: forming an insulating layer 130 on the substrate 110 to cover the first metal layer 120 and the substrate 110 and forming an insulating layer 130 on the substrate 110 to cover the first metal layer 120 and the substrate 110.

Figure 4C:
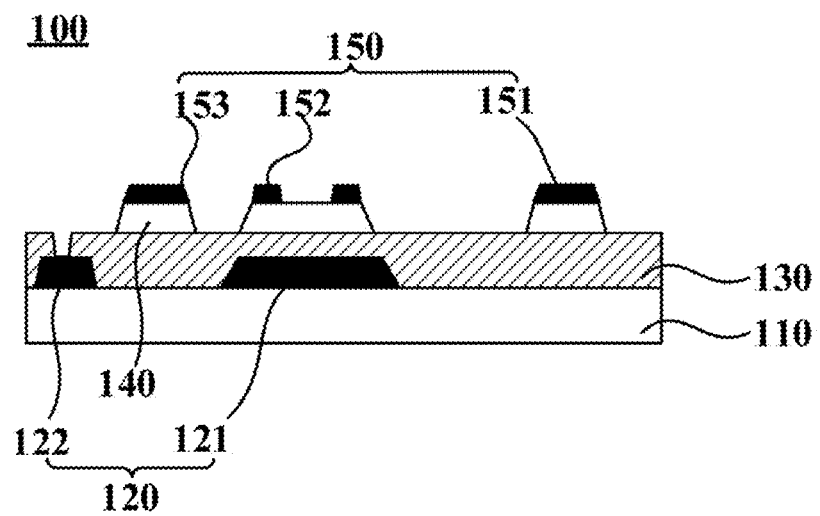

As shown in FIGS. 3 and 4C, the manufacturing method includes step S3: forming a patterned active layer 140 and a second metal layer 150 on the insulating layer 130, the second metal layer includes a pad area 151, a source and drain 152, and a second connecting portion 153.

Figure 4D:
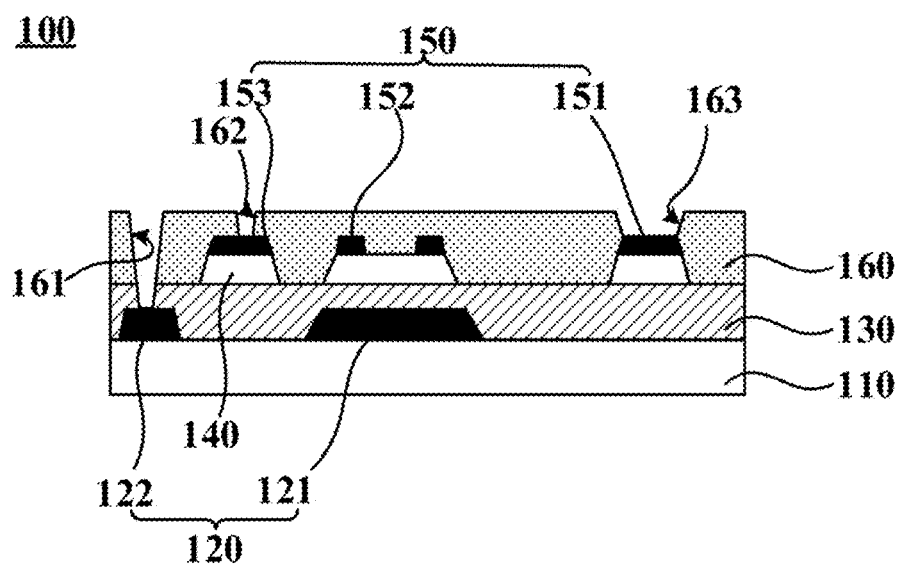

As shown in FIGS. 3 and 4D, the manufacturing method includes step S4: forming the planarization layer 160 on the insulating layer 130 to cover the active layer 140, the second metal layer 150, and the insulating layer 130, and then patterning the planarization layer 160 to form a first via hole 161, a second via hole 162 and a third via hole 163. The first via hole 161 exposes a portion of the first connecting portion 122, the second via hole 162 exposes a portion of the second connecting portion 152, and the third via hole 163 exposes the pad area 151.

As shown in FIGS. 2 and 3, the manufacturing method includes step S5: patterning the planarization layer 160 to form a metal laminating layer 170. The metal laminating layer 170 covers a portion of the first connecting portion 122 exposed by the first via hole 161 and a portion of the second connecting portion 152 exposed by the second via hole 162, and exposes the pad area 151 exposed by the third via hole 163.

In the present application, the gate 121 is prepared by depositing a first metal layer 120 on a surface of the substrate 110 and undergoing processes of coating, exposure, development, etching, stripping, and the like. The active layer 140 and the second metal layer 150 use a halftone mask, and the preparation is completed through processes of coating, exposure, development, etching, stripping, and the like. The first via hole 161, the second via hole 162, and the third via hole 163 are formed at once time by one mask, and the first via hole 151 and the second via hole 152 may have sizes between 3 μm and 30 μm. The size of the third via hole 163 just needs to correspond to the pad area 151, and no other limit is required.

Figure 5:
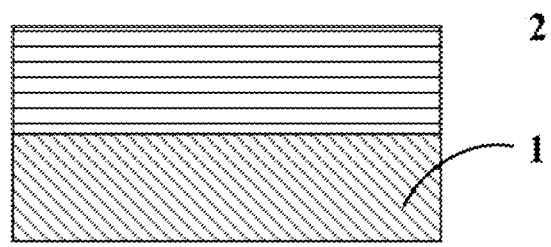
FIG. 5 is a schematic structural diagram of a display device provided by the present application.

As shown in FIG. 5, the present application also provides a display device, including the backlight module 1 and the display panel 2 shown in FIG. 1. The display device can be applied to various types of electronic equipment, such as mobile phones and other communication equipment, various types of computers, various types of wearable display equipment, and various types of electronic display screens of machinery or vehicles.

In the backlight module of this application, the first metal layer and the second metal layer are connected by the metal laminating layer to solve technical problems that indium tin oxide (ITO) material of prior art has low conductivity, slow response times, and the via hole loses its connection function due to an aging phenomenon after high temperature.

In particular, in the backlight module of the present application, the metal laminating layer contacts the planarization layer through the first metal molybdenum. It not only realizes a high conductivity connection between the first metal layer and the second metal layer but also increases adhesion between the metal laminating layer and the planarization layer. In addition, the metal laminating layer can achieve high light reflection by selecting the second metal with a light reflectivity greater than or equal to 80% to replace the organic reflective layer in the prior art, thereby reducing process steps and manufacturing cost.

Therefore, in the backlight module of the present application, the metal laminating layer is disposed to solve the technical problems that indium tin oxide (ITO) has low conductivity and prone to failure in the prior art. In addition, the organic reflective layer and the ITO layer that need to be patterned in steps in the prior art are combined into one, so as to reduce the process steps and the masks used in the process and thereby reducing the manufacturing cost.

In the above embodiments, the description of each embodiment has its own emphasis. For the parts that are not detailed in an embodiment, please refer to the related descriptions in other embodiments.

The backlight module, manufacturing method thereof, and the display device provided by the embodiments of the present application have been described in detail above. In this descriptions, specific embodiments are used to explain the principle and implementation of the present application. The descriptions of the embodiments are only used to help understand the technical solutions and core ideas of the present application. Those of ordinary skill in the art should understand that the technical solutions described in the foregoing embodiments can be modified, or some of the technical features can be equivalently substituted. However, these modifications or substitutions do not deviate the essence of the corresponding technical solutions from the scope of the technical solutions in the embodiments of the present application.

What is claimed is:

1. A backlight module, comprising an array substrate and a plurality of mini-LED chips disposed on the array substrate, wherein the array substrate comprises:
a substrate;
a first metal layer disposed on the substrate, wherein the first metal layer comprises a first connecting portion and a gate;
an insulating layer covering the first metal layer;
a second metal layer disposed on the insulating layer, wherein the second metal layer comprises a second connecting portion, a source/drain, and pad areas;
a planarization layer covering the second metal layer; and
a metal laminating layer disposed on the planarization layer, wherein the metal laminating layer comprises a third metal layer, a fourth metal layer, and a metal oxide layer, the third metal layer comprises molybdenum, the third metal layer is electrically connected to the first connecting portion through a first via hole penetrating the planarization layer and a part of the insulating layer, and the third metal layer is further electrically connected to the second connecting portion through a second via hole penetrating a part of the planarization layer; and
wherein two electrodes of each mini-LED chip are electrically connected to two of the pad areas through two openings penetrating the metal laminating layer and a part of the planarization layer, and the two electrodes have shapes fitted with shapes of the two openings.

2. The backlight module of claim 1, wherein a conductivity of the third metal layer is higher than a conductivity of the metal oxide layer.

3. The backlight module of claim 1, wherein a light reflectance of the fourth metal layer is greater than or equal to 80%.

4. The backlight module of claim 1, wherein a conductivity of the fourth metal layer is higher than a conductivity of the metal oxide layer.

5. The backlight module of claim 1, wherein the fourth metal layer is an alloy comprising at least two of molybdenum, aluminum, silver, titanium, or nickel.

6. The backlight module of claim 1, wherein the fourth metal layer is disposed between the third metal layer and the metal oxide layer.

7. The backlight module of claim 1, wherein the metal oxide layer has a compound comprising at least one of indium tin oxide, indium zinc oxide, or indium zinc tin oxide.

8. The backlight module of claim 1, wherein the pad areas are arranged in an array or evenly disposed on the second metal layer.

9. A display device, comprising the backlight module of claim 1.

10. A method of manufacturing the backlight module of claim 1, comprising following steps:
    providing the substrate, and forming a patterned first metal layer on the substrate;
    forming the insulating layer on the substrate to cover the first metal layer and the substrate;
    forming a patterned active layer and the second metal layer on the insulating layer;
    forming the planarization layer on the insulating layer to cover the active layer, the second metal layer, and the insulating layer;
    forming the first via hole penetrating the planarization layer and the insulating layer to expose a portion of the first metal layer, and forming the second via hole penetrating the planarization layer to expose a portion of the second metal layer; and
    forming the metal laminating layer on the planarization layer, the metal laminating layer contacting the portion of the first metal layer through the first via hole, and the metal laminating layer contacting the portion of the second metal layer through the second via hole.

11. The manufacturing method of claim 10, wherein an opening is formed in a step of forming the first via hole and the second via hole to enable the planarization layer to expose one of the pad areas; and in a step of forming the metal laminating layer on the planarization layer, the metal laminating layer exposes the pad areas.

12. The manufacturing method of claim 10, further comprising: mounting the plurality of mini-LED chips, wherein the plurality of mini-LED chips are disposed on the array substrate by connecting to the pad areas.

13. The manufacturing method of claim 10, wherein a diameter of the first via hole and a diameter of the second via hole are between 3 μm and 30 μm.

* * * * *